(12) United States Patent
Shver

(10) Patent No.: US 7,483,471 B2
(45) Date of Patent: Jan. 27, 2009

(54) COOLING DEVICE FOR USE IN AN ELECTRIC ARC FURNACE

(75) Inventor: Valery Shver, Alpharetta, GA (US)

(73) Assignee: Process Technology International, Tucker, GA (US)

( * ) Notice: Subject to any disclaimer, the term of this patent is extended or adjusted under 35 U.S.C. 154(b) by 89 days.

(21) Appl. No.: 11/361,725

(22) Filed: Feb. 24, 2006

(65) Prior Publication Data

US 2007/0211780 A1   Sep. 13, 2007

(51) Int. Cl.
*F27D 1/12* (2006.01)
(52) U.S. Cl. .............................. 373/76; 373/74; 432/83; 219/75
(58) Field of Classification Search .................... 373/74, 373/76, 24; 239/132, 3, 596, 132.1; 266/123, 266/159; 110/261, 264; 313/627, 231.41; 219/145.21, 146.21, 121.48, 121.51, 121.52, 219/121.45, 121.49, 121.57, 121.11, 74, 219/75, 121.5
See application file for complete search history.

(56) References Cited

U.S. PATENT DOCUMENTS

| | | | | |
|---|---|---|---|---|
| 2,807,506 A | * | 9/1957 | Gehring | .................... 239/132.3 |
| 3,065,916 A | * | 11/1962 | Kurzinski | ................. 239/132.3 |
| 3,130,292 A | * | 4/1964 | Gage et al. | ..................... 219/75 |
| 4,077,614 A | | 3/1978 | Udo et al. | |
| 5,247,152 A | * | 9/1993 | Blankenship | ........... 219/121.49 |

\* cited by examiner

*Primary Examiner*—Quang T Van
(74) *Attorney, Agent, or Firm*—Troutman Sanders LLP; James E. Schutz

(57) ABSTRACT

A cooling device for use in an electric arc furnace is provided. The cooling device provides a novel and effective method for cooling burners, lances, enclosures, and other devices used in high heat environments, such as in Electric Arc Furnaces. According to one aspect of the invention used in a steel making process in an electric arc furnace, a cooling tube is inserted into a cooling cavity in a burner. Cooling fluid is injected through the cooling tube into the cavity to cool the portions of the burner adjacent the cooling cavity. The cooling fluid is then extracted from the cavity through a concentric space between the cooling tube and the cooling cavity. According to another aspect of the present invention, a cooling fluid distribution flange is provided to distribute cooling fluid to a plurality of cooling tubes to inject cooling fluid into a plurality of associated cooling cavities.

12 Claims, 4 Drawing Sheets

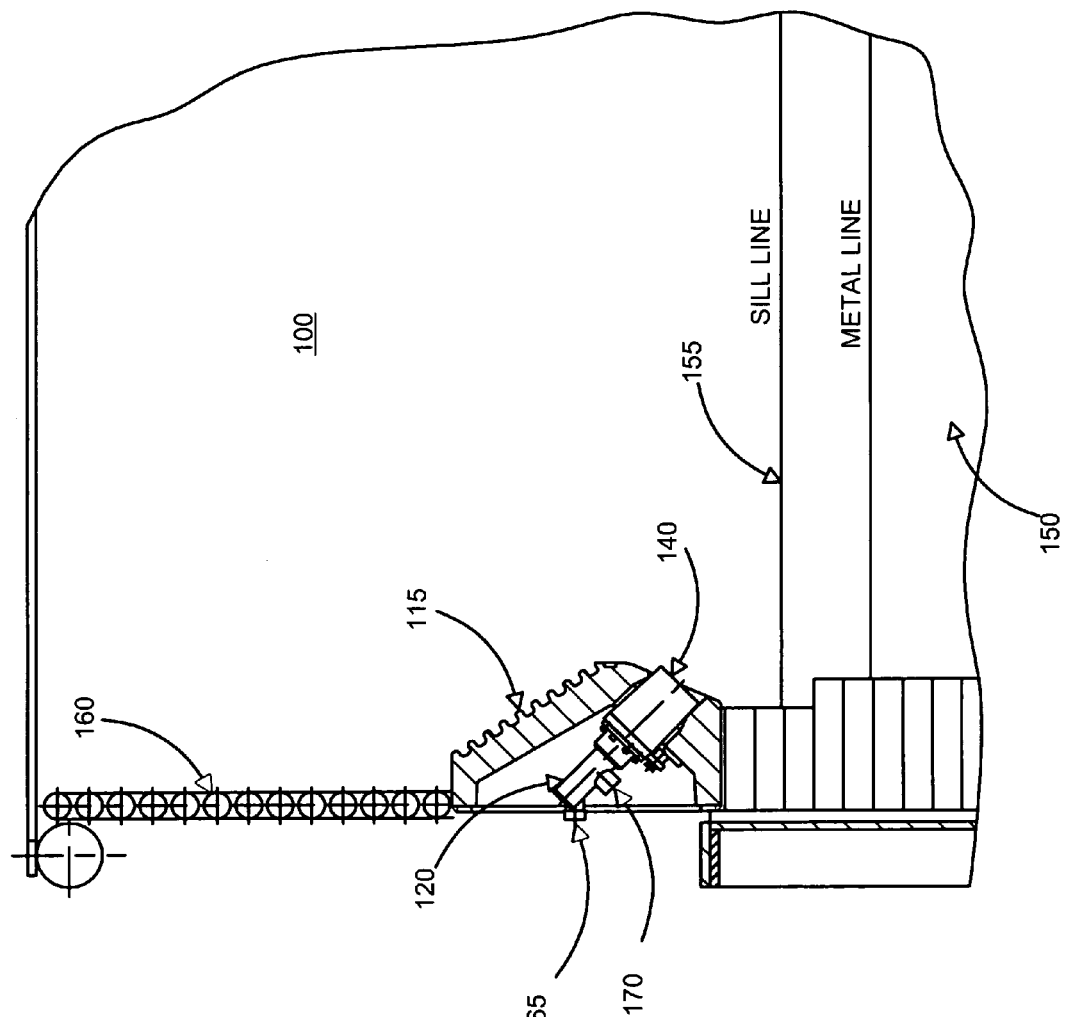

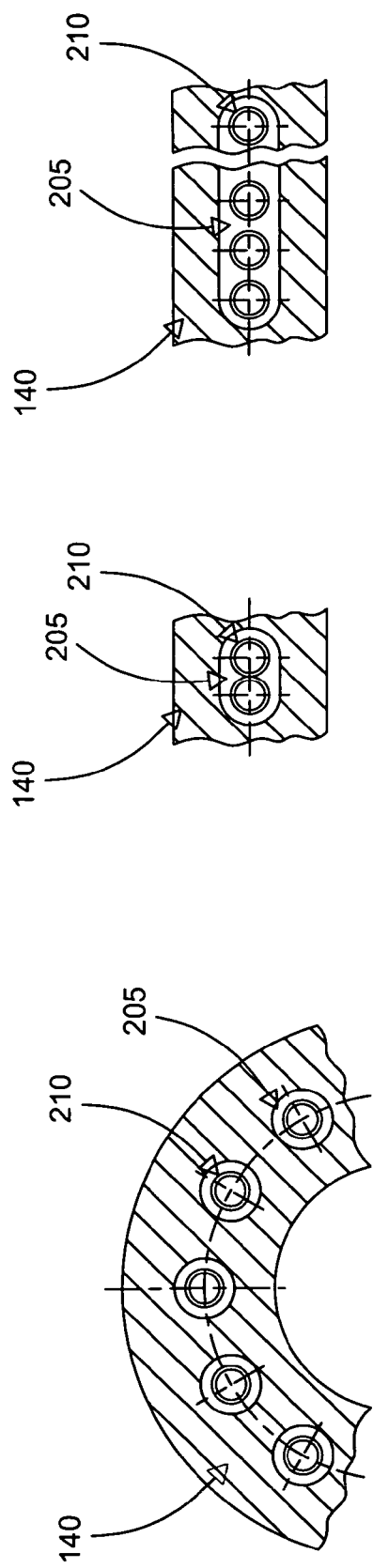

COOLING DEVICE FOR USE IN AN ELECTRIC ARC FURNACE

TECHNICAL FIELD

The present invention relates generally to a method and apparatus used in metal melting, refining and processing, and more particularly, a method and apparatus for cooling combustion devices in a metal melting furnace.

BACKGROUND

Electric arc furnaces (EAFs) make steel by using an electric arc to melt one or more charges of scrap metal, hot metal, iron based materials, or other meltable materials, which is placed within the furnace. Modern EAFs may also make steel by melting DRI (direct reduced iron) combined with the hot metal from a blast furnace. In addition to the electrical energy of the arc, chemical energy is provided by auxiliary burners using fuel and an oxidizing gas to produce combustion products with a high heat content to assist the arc.

If the EAF is used as a scrap melter, the scrap burden is charged by dumping it into the furnace through the roof opening from buckets, which also may include charged carbon and slag forming materials. A similar charging method using a ladle for the hot metal from a blast furnace may be used along with injection of the DRI to produce the burden. Additionally, these materials could be added through other openings in the furnace.

In the melting phase, the electric arc and burners melt the burden into a molten pool of metal, termed an iron carbon melt, which accumulates at the bottom or hearth of the furnace. Typically, after a flat bath has been formed by melting of all introduced burden, the electric arc furnace enters a refining and/or decarburization phase. In this phase, the metal continues to be heated by the arc until the slag forming materials combine with impurities in the iron carbon melt and rise to the surface as slag. During the heating of the iron carbon melt, it reaches the temperature and conditions when carbon in the melt combines with oxygen present in the bath to form carbon monoxide bubbles. Generally, flows of oxygen are blown into the bath with either lances or burner/lances to produce a decarburization of the bath by the oxidation of the carbon contained in the bath.

A furnace must reach very high temperatures to melt burden into molten metal. For example, scrap steel melts at approximately 2800° F. Additionally, it is typically desirable to raise the temperature of the melt sufficiently above the melting point (typically to 2950° F.-3050° F.) to allow the melt to be transferred from the furnace to a desired location and further processed without prematurely solidifying. In addition to melting the scrap, the electric arc and molten burden can damage the furnace itself as well as any devices placed inside the furnace, such as burners, lances, and enclosures for burners and lances.

To combat heat related problems, furnace and furnace component designers generally use water cooled devices and panels. Such devices and panels use a constant flow of cooling fluid through the devices, close to the surfaces that are exposed to heat, to help dissipate the heat. The cooling fluid thus cools the panels, from the inside, and lowers the temperature of the device.

Most fluid cooled devices use a serpentine arrangement to direct water through the device. While such arrangements are often effective at cooling furnace components, they are not sufficiently efficient and often allow hot spots to develop. One reason why a serpentine arrangement is not efficient is that as the water flows through the device, small bubbles often form along the walls of the water pipes. These bubbles can insulate a portion of the pipe and prevent the water from cooling the device sufficiently.

Within a cooling pipe, cooling fluid generally moves most rapidly and turbulently through the center of the pipe, and likewise it moves less rapidly and less turbulently along the walls of the pipe. Those skilled in the art may be familiar with the Reynolds number of a flow. The Reynolds number is indicative of the turbulence of the fluid. A low Reynolds number indicates that the fluid flow is laminar and a high Reynolds number indicates that the fluid flow is turbulent. In cooling operations, it is desirable for the fluid flow to be turbulent and thus a high Reynolds number is desired. Often, the turbulence of the fluid along the pipe wall is low even when the overall fluid flow through the pipe is high. One solution to solving this problem is to place material along the wall in the pipe to partially obstruct the flow and to increase the turbulence of the fluid along the pipe wall. While this solution may improve the turbulence of the fluid in a location, it may cause other areas of low turbulence to form.

Another remedy to this problem is to increase the velocity and turbulence of the water by increasing the flow of water through the pipe. This may help wash away the bubbles, but it requires significantly higher water flow and pressure, thereby increasing the cost of operations.

Further, certain portions of a furnace device may experience greater heat effects than other portions of the device. The serpentine structure does not allow a furnace device to receive more cooling in one area than another. Rather, the same force of water flows through all sections of the serpentine.

One solution used to address the problems associated with the serpentine structure is the use of spray nozzles to spray the walls of a furnace to keep them cool. One such solution is disclosed in U.S. Pat. No. 4,813,055 to Heggart et al (hereinafter "Heggart"). In Heggart, a furnace is built with an inner and an outer shell and spray nozzles are installed between the two shells to spray and cool the outside of the inner shell. While this solution often works effectively for furnace walls, it is not practical for use in furnace components due to space limitations.

Therefore, it would be advantageous to provide a method and apparatus for cooling furnace devices that overcome the problems associated with serpentine water cooling and spray system water cooling.

Additionally, it would be advantageous to provide a method and apparatus for cooling furnace devices that allows cooling fluid to be directed to specific portions of the furnace device.

BRIEF SUMMARY OF THE INVENTION

The present invention provides an apparatus for cooling furnace devices that overcomes the deficiencies of the prior art. Preferably, the present invention provides efficient and effective cooling of burners, lances, and related enclosures used in making steel in an electric arc furnace.

The present invention provides improved cooling for devices used in exceptionally hot environments such as, but not limited to, the inside of an Electric Arc Furnace. In accordance with the present invention, one or more cavities are provided in a device to be cooled. These cavities preferably provide access to the inside of the device close to regions in need of cooling. A cooling tube is inserted into the cavity to inject cooling fluid into the cavity. By inserting the tube into the cavity, the cooling fluid may be directed to the precise locations for which cooling is desired. Additionally, the cooling fluid may be directed toward critical areas of the device in need of cooling to ensure that hot spots do not develop.

In one embodiment of the present invention, a cooling device is installed in a burner used in an electric arc furnace. In such an embodiment, a cooling tube is inserted into a cooling cavity in the combustion chamber of the burner. Cooling fluid is injected through the cooling tube into the cavity to cool the portions of the burner adjacent the cooling cavity. The cooling fluid is then extracted from the cavity through a concentric space between the cooling tube and the cooling cavity.

According to another aspect of the present invention, a cooling fluid distribution section is provided to distribute cooling fluid to a plurality of cooling tubes to inject cooling fluid into a plurality of associated cooling cavities.

According to another aspect of the present invention, the cooling cavities are provided at locations identified a susceptible to overheating.

According to yet another aspect of the present invention, the cooling cavity has a first outer diameter, the cooling cavity has a second diameter, and the second diameter is larger than the first diameter.

These and other features as well as advantages, which characterize the various preferred embodiments of present invention, will be apparent from a reading of the following detailed description and a review of the associated drawings.

BRIEF DESCRIPTION OF THE DRAWINGS

FIG. 1 is a cross-sectioned side view of an exemplary embodiment a burner mounted in a burner enclosure in an electric arc furnace and which is constructed in accordance with an exemplary embodiment of the present invention.

FIG. 4a is a cross-sectioned front view of a cooling fluid distribution section for distributing cooling fluid to a plurality of cooling devices in accordance with an exemplary embodiment of the present invention.

FIG. 4b and FIG. 4c illustrate an exemplary embodiment of the present invention in which a plurality of cooling fluid injectors are inserted into a single cooling cavity.

DETAILED DESCRIPTION OF PREFERRED EMBODIMENTS

Figure 2B:
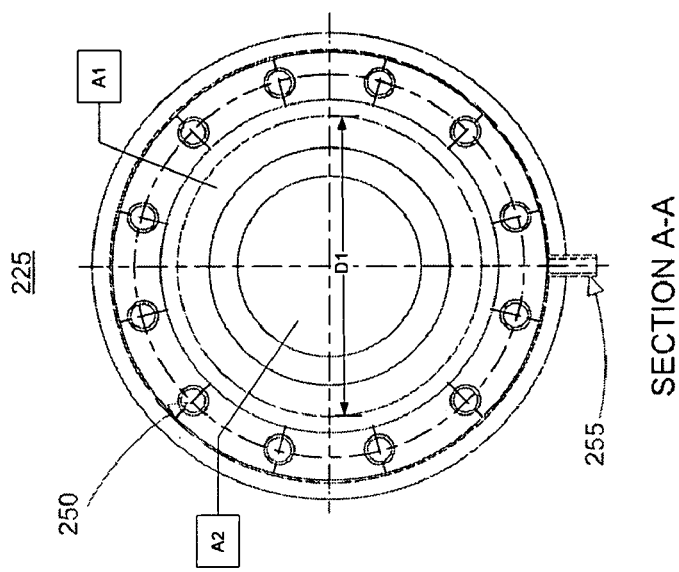
FIG. 2b is a cross-sectioned view of the burner illustrated in FIG. 2a taken at 'A'.

Referring now to the drawings, in which like numerals represent like elements, exemplary embodiments of the present invention are herein described.

FIG. 1 is a cross-sectioned side view of an exemplary embodiment a burner mounted in a burner enclosure in an electric arc furnace ("EAF") and which is constructed in accordance with an exemplary embodiment of the present invention. In an exemplary embodiment, the EAF 100 melts ferrous scrap, or other iron based materials, by means of an electric arc produced from one or more electrodes to collect a molten metal bath or melt 150 in its hearth. The metal bath level varies significantly during the melting process. The bath level generally begins with a hot heel level, which is the iron melt left from the previous heat. As multiple charges of scrap or other iron base materials are melted, the level rises. The furnace is typically filled to a level about 18 inches down from the sill line 155. Other steel making processes such as DRI melting and the ConSteel process produce similar bath level changes. Typically, the EAF hearth is generally spherical in shape and is made of refractory material able to withstand the high temperature of the molten metal. The hearth of the EAF 100 is typically surrounded by an upper shell comprised of a series of fluid cooled panels. It is known that the fluid cooled panels forming the side wall 160 of the furnace 100 can be of several conventional types. These panels are typically supplied with cooling fluid from circumferential supply conduits, which are connected to cause fluid to circulate through the panels and then exit to carry off heat.

Alternatively, spray cooled panels may be used in place of fluid cooled panels. In a typical spray cooled system, two concentric plate shells separated by a gap are used. Between the two shells are installed numerous spray nozzles that are adapted to spray the outside of the inner shell (the shell adjacent the interior of the furnace). The fluid sprayed onto the shell cools the shell material.

The melt 150, generally comprising iron and carbon, is generally covered with various amounts of slag, which is produced by the chemical reactions between the melt and slag forming materials added to the furnace before or during the melting process of the metal. Once the scrap metal or other burden has been melted, the metal bath 150 is generally refined by additives and decarburized by oxygen lancing. This produces the required chemistry for the melt and reduces the carbon content of the metal to the grade of steel desired.

After the electrodes are turned on, a foamy slag may be developed by injecting particulate carbon to protect the furnace components from radiation from the arc. During refining and thereafter, the metal bath 150 is typically heated by the electric arc above its melting temperature. The superheating is used to allow the metal bath 150 to remain at a high enough temperature while being transported in a ladle and while finishing other process steps. This superheating stage may typically raise the temperature of the melt to a temperature in the range of 2950° F.-3050° F., or even higher. Accordingly, every device inside the furnace must be capable of withstanding this intense heat.

FIG. 1 shows a burner 120 with a combustion chamber 140 installed in a furnace. Throughout the present description, the present invention will be discussed as it is installed in a burner combustion chamber 140. However, those of ordinary skill in the art will recognize that the principles of the present invention may be applied to various devices used in a furnace, or other high temperature environment, that require cooling. In particular, it is noted that the present invention may be used in burners, lances, and enclosures for burners and lances, as well as any other device now used or later developed for use in a furnace.

The burner 120 may be used to direct additional heat to specific spots in the furnace 100. An exemplary burner 120 for use with the present invention receives fuel and oxygen through a fuel inlet 170 and an oxygen inlet 165 and mixes the fuel and oxygen for combustion in the combustion chamber 140. Since the burner 120 is enclosed in burner enclosure 115, which is preferably water cooled, it is largely insulated from the intense heat of the furnace 100. However, the combustion chamber 140 of the burner 120 is mounted such that it protrudes through an opening in the enclosure 115 so that is can inject a flame toward the melt 150. Thus, the combustion chamber 140 is exposed to heat generated by the burner 120 as well as heat radiated in the furnace 100. Accordingly, the combustion chamber 140 must be cooled to prevent it from being damaged by the heat.

Figure 2A:
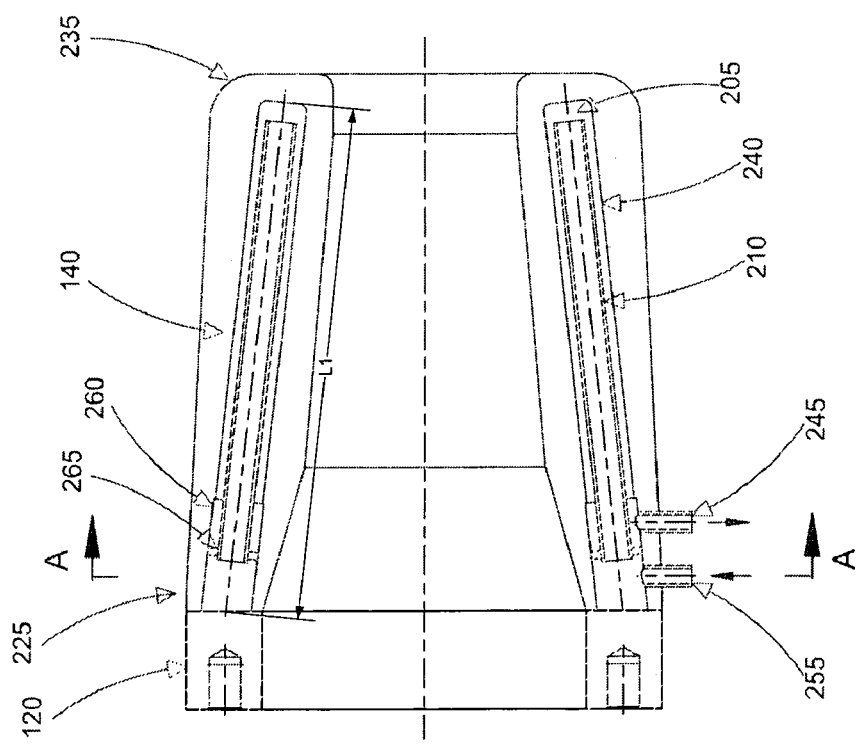
FIG. 2a is a cross-sectioned side view of a combustion chamber, for use with a burner, incorporating a cooling device in accordance with an exemplary embodiment of the present invention.
Figure 3:
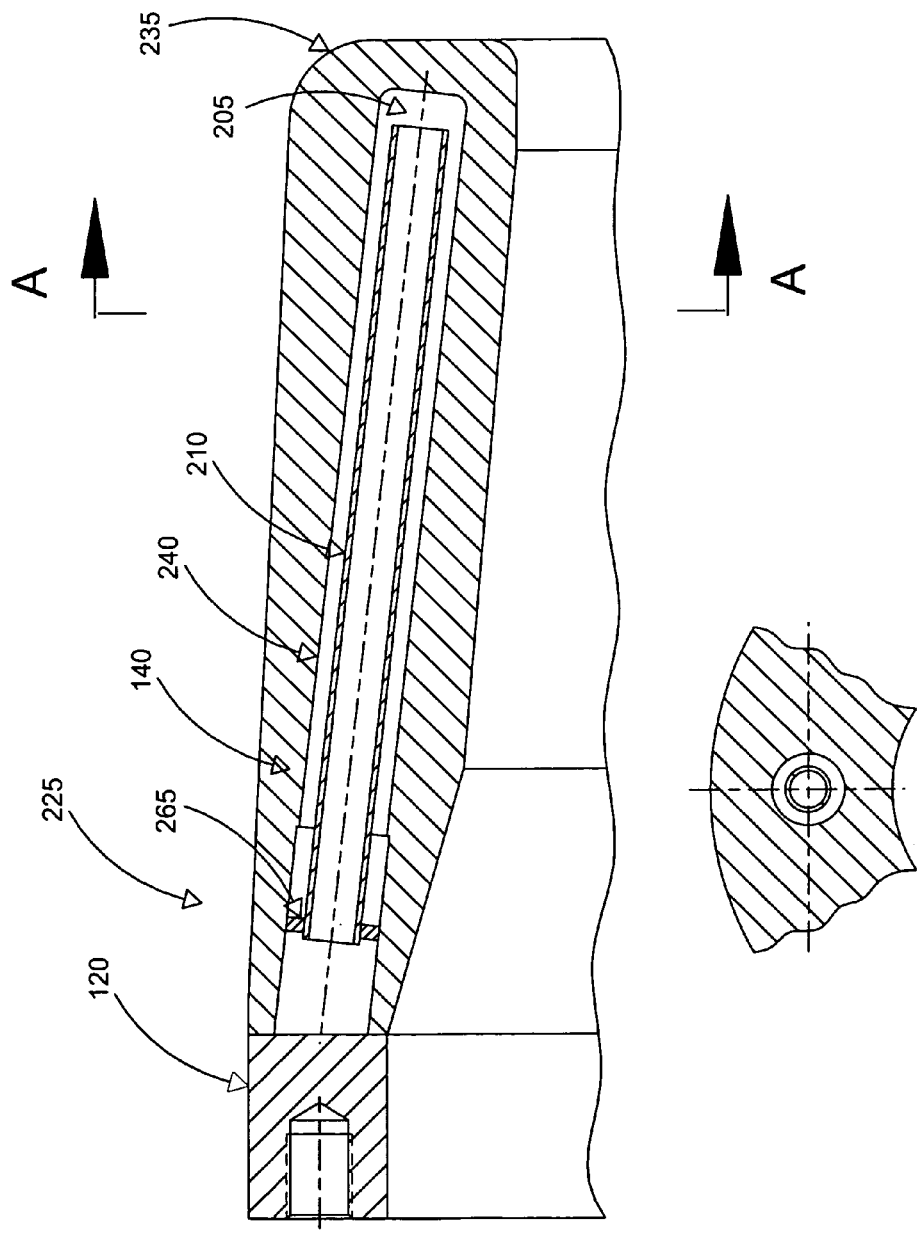
FIG. 3 is a cross-sectioned side view of a portion of a combustion chamber, for use with a burner, incorporating a cooling device in accordance with an exemplary embodiment of the present invention.

FIG. 2a is a cross-sectioned side view of a combustion chamber 140, for use with a burner 120, incorporating a cooling device in accordance with an exemplary embodiment of the present invention. FIG. 3 is an illustration of a single cooling device in accordance with an exemplary embodiment of the present invention. As shown in FIGS. 2a and 3, an exemplary embodiment of the present invention includes a cooling cavity 205 in the combustion chamber 140. The cooling cavity 205 may be created in the combustion chamber 140 in a variety of ways. In a preferred embodiment of the present invention, the cooling cavity 205 is drilled into the combustion chamber 140 by drilling a hole longitudinally, from the side of the combustion chamber 140 that attaches to the burner 120, toward the front face 235 of the combustion chamber 140 that faces into the furnace 100 when in operation. Alternatively, the combustion chamber 140 may be cast with cooling cavities in place. Preferably, the cooling cavity 205 extends through a significant portion of the combustion chamber 140. However, it is typically desirable for the cavity 205 to end a sufficient distance from the end of the combustion chamber such that the structural integrity of the combustion chamber 140 is not compromised. The cooling cavity 205 may be generally described as having a length L1 and a cross sectional area A1. For cylindrical cooling cavities 205, the cooling cavity 205 may be described as having an inside diameter D1.

In various embodiments of the present invention, the cooling cavities 205 may be positioned to address particular cooling requirements of the device to be cooled. For example, and not limitation, in a burner combustion chamber 140, it may be desirable to focus cooling efforts on the front face of the combustion chamber 140 that faces the inside of the furnace. This portion of the combustion chamber 140 is exposed to the most heat and is the most susceptible to over heating. Accordingly, it may be desirable to direct the cooling cavity 205 toward this front face so that the cooling fluid injected into the cooling cavity 205 is injected directly to this critical region. In other embodiments, those of ordinary skill in the art may determine which areas of the device to be cooled are most susceptible to heat damage and direct the cooling cavities to these locations.

Additionally, it is often preferable to utilize multiple cooling cavities spaced around a device to be cooled. For example, and not limitation, it may be desirable to space multiple cooling cavities around the circumference of a burner combustion chamber. Since each cooling cavity is typically able to cool a portion of the device within a certain distance from the cooling cavity, it is typically desirable to position each cooling cavity close enough to one another such that the cooling zones overlap.

In an exemplary embodiment of the present invention, the cooling cavity 205 has a cross sectional area A1 large enough to accommodate a cooling fluid injector 210. The cooling fluid injector 210 is preferably an elongated hollow tube sized for insertion into the cooling cavity 205. The cooling fluid injector 210 has a cross sectional area, A2. It should be noted that the cooling cavity 205 and/or the cooling fluid injector 210 may have a cylindrical configuration or other configurations. For example, and not limitation, rather than having a circular cross section, they may utilize a square, rectangle, ellipse, polygon, or other geometric shape. The present description generally refers to the cooling cavity 205 and cooling fluid injector 210 as having a cross sectional area, but it may also be referred to as having a diameter for convenience. Additionally, a cylindrical configuration is often preferable as it is typically the most cost effective to create. The cooling fluid injector 210 preferably has a cross sectional area that is sufficiently smaller than the cross sectional area of the cooling cavity that cooling fluid injected through the cooling fluid injector 210 can return out of the cooling cavity 205 in a space 240 created outside the cooling fluid injector 210 and inside the cooling cavity 205. In an exemplary embodiment of the present invention, the cross sectional area of the cooling cavity, A1, is generally related to the cross sectional area of the cooling fluid injector, A2, by the following equation: $A1 \geq 2*A2$. However, while this relationship is preferred, the present invention may be practiced as long as $A1 > A2$, provided that the geometric relationship between the cooling cavity and the cooling fluid injector is such that the cooling fluid injector fits inside the cooling cavity.

The cooling fluid injector 210 is preferably of sufficient length to inject cooling fluid close to the closed end of the cooling cavity 205. In an exemplary embodiment of the present invention, the cooling fluid injector 210 extends into the cooling cavity 205 such that the distance between the end of the cooling fluid injector 210 and the end of the cooling cavity 205 is less than twenty (20) times the hydraulic radius of the cooling cavity 205. Those skilled in the art will recognize that the hydraulic radius is defined as the area of the flow section divided by the wetted perimeter.

FIG. 2b is a cross-sectioned view of the combustion chamber 140 taken at 'A' as identified in FIG. 2a. This portion of the combustion chamber provides cooling fluid distribution to each of a plurality of cooling fluid injectors 210. Throughout the present description, the portion illustrated in FIG. 2b may be referred to as the cooling fluid distribution section 225. In an exemplary embodiment of the present invention, a cooling fluid distribution section 225 includes a cooling fluid inlet 255 and a plurality of cooling fluid distribution holes 250. In operation, the cooling fluid inlet 255 may be connected to a cooling fluid source. Typically, the cooling fluid source may be, but is not limited to, a water source.

The cooling fluid enters the cooling fluid distribution section 225 through the cooling fluid inlet 255 and is directed to each cooling fluid distribution hole 250. Preferably the cooling fluid distribution section 225 provides a substantially equal quantity of cooling fluid to each cooling fluid distribution hole 250. Alternatively, water flow may be customized for each cooling fluid distribution hole 250 or for groups of cooling fluid distribution holes 250. Each cooling fluid distribution hole 250 is preferably sufficiently aligned with a respective cooling fluid injector 210 such that the cooling fluid is directed into the cooling fluid injector 210. Additionally, cooling fluid distribution holes 250 are preferably sufficiently small so as to cover the cooling cavity 205, except for the portion of the cooling cavity 205 that contains the cooling fluid injector 210.

In operation, cooling fluid is fed to the cooling fluid inlet 255 of the cooling fluid distribution section 225 and directed to the cooling fluid distribution holes 250. The cooling fluid is injected through the cooling fluid distribution hole 250 to a cooling fluid injector 210. The cooling fluid is then directed through the cooling fluid injector 210 into the cooling cavity 205. The cooling fluid contacts the walls of the cooling cavity 205 and cools the combustion chamber 140. The cooling fluid then drains through the space 240 between the cooling fluid injector 210 and the cooling cavity 205 through the space 240 toward the cooling fluid extraction section 260. The cooling fluid extraction section 260 may typically be located close to the cooling fluid distribution section 225. The cooling fluid extraction section 260 provides access to each cooling cavity 205 and allows the cooling fluid to exit the combustion chamber through a cooling fluid outlet 245. The cooling fluid outlet 245 may be connected to a cooling fluid return. The cooling fluid may be discarded after it is returned from the cooling device, or it may be reused. The cooling fluid extraction section 260 may be separated from the cooling fluid distribution section 225 by a flange 265.

The flange 265 may be fabricated such that solid portions of the flange 265 cover the spaces 240 between the cooling fluid injectors 210 and the cooling cavities 205. Additionally, the flange 265 may include openings aligned with the cooling fluid distribution holes 250 to allow fluid to pass from the cooling distribution section 225 to the cooling fluid injectors 210. Accordingly, the flange 265 allows cooling fluid to pass from the cooling fluid distribution section 225 to the cooling fluid injectors 210 and prevents cooling fluid from passing from the space 240 between the cooling fluid injectors 210 and the cooling cavities 205 from passing back to the cooling fluid distribution section.

As shown in FIG. 2b, the cooling fluid holes 250 are positioned in a ring around the circumference of the combustion block of a burner. In an exemplary embodiment of the present invention, the cooling holes may be spaced between 20 degrees and 60 degrees apart around the device. In the embodiment illustrated in FIG. 2b, the cooling holes are spaced approximately 45 degrees apart. This spacing is merely an example of a suitable cooling cavity spacing in a burner combustion chamber.

FIG. 4a illustrates an exemplary embodiment of the present invention in which each cooling cavity is substantially circular in cross section and is associated with a single cooling fluid injector 210. In alternative embodiments, the cooling cavity 205 may be expanded such that it may accommodate a plurality of cooling fluid injectors 210. FIG. 4b illustrates an exemplary embodiment of the present invention in which the cooling cavity 205 is large enough to accommodate two cooling fluid injectors 210. As shown in FIG. 4b, the two cooling fluid injectors 210 are located adjacent each other. In such an arrangement, injected cooling fluid returns from the cooling cavity 205 through any portions of the cooling cavity 205 not filled by the cooling fluid injectors 210. Those skilled in the art will recognize that the concepts of the present invention may be expanded to accommodate any number of cooling fluid injectors 210. FIG. 4c illustrates one such embodiment in which the cooling cavity 205 is large enough to accommodate a desired number of cooling fluid injectors 210.

While the present description has been described with particular reference to the invention as embodied within the combustion chamber of a burner, those skilled in the art will recognize that the cooling device may be implemented in any device requiring cooling. In particular, a plurality of cooling devices may be beneficial in burner enclosures, lances, and other EAF components.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

I claim:

1. A cooling device for use in a high temperature environment comprising:
a first cooling cavity having a first cross sectional area, a first end, a second end, and a central axis between the first end and the second end of the first cooling cavity;
a first cooling tube having a second cross sectional area, a first end, a second end, and a central axis between the first and second end of the first cooling tube, the first cooling tube being inserted through the first end of the first cooling cavity;
the first cooling tube being adapted to eject a cooling fluid through the second end of the first cooling tube;
the first cooling cavity and the first cooling tube aligned substantially coaxially;
a second cooling cavity having a third cross sectional area substantially equal to the first cross sectional area, a first end, a second end, and a central axis between the first end and the second end of the second cooling cavity;
a second cooling tube having a fourth cross sectional area, a first end, a second end, and a central axis between the first and second end of the second cooling tube, the second cooling tube being inserted through the open end of the second cooling cavity;
the second cooling cavity and the second cooling tube aligned substantially coaxially;
the second cooling tube being adapted to eject a cooling fluid through the second end; and
a cooling fluid distribution section adapted to distribute cooling fluid to the first cooling tube and the second cooling tube.

2. The device of claim 1, wherein the first cross sectional area of the first cooling cavity is larger than the second cross sectional area of the first cooling tube.

3. The device of claim 1, wherein the first cross sectional area of the first cooling cavity is greater than or equal to twice the second cross sectional area of the first cooling tube.

4. The device of claim 1, wherein the second end of the first cooling tube is located a distance from the second end of the first cooling cavity that is less than eight times the hydraulic radius of the first cooling tube.

5. The device of claim 1, wherein the first cooling cavity is in a combustion block of a burner.

6. The device of claim 1, wherein the first cooling cavity is in a burner enclosure.

7. The device of claim 1, wherein the first cooling cavity is in a chemical injection lance for use in a metallurgical vessel.

8. The device of claim 1, wherein the first cooling cavity has a side wall and the cooling fluid is extracted from the first cooling cavity through a space between the first cooling tube and the side wall.

9. The device of claim 1, wherein the cooling fluid distribution section comprises:
a cooling fluid inlet; and
a plurality of cooling fluid distribution holes for providing cooling fluid to the first and second cooling tubes.

10. The device of claim 9, further comprising:
a cooling fluid extraction section for extracting cooling fluid from the first and second cooling cavities.

11. The device of claim 1, further comprising:
a second cooling tube having a third cross sectional area, a first end, a second end, and a central axis between the first and second end, the second cooling tube being inserted through the first end of the first cooling cavity; and
the second cooling tube being adapted to eject a cooling fluid through the second end of the second cooling tube.

12. The device of claim 1, wherein the cooling cavity is adapted to receive a plurality of cooling tubes.

* * * * *